F. C. ROWLAND.
Pitman Connection for Steam-Engines.

No. 227,059.                    Patented April 27, 1880.

Witnesses.

Fred C. Rowland
Inventor
By atty.

UNITED STATES PATENT OFFICE.

FREDERICK C. ROWLAND, OF NEW HAVEN, CONNECTICUT.

PITMAN-CONNECTION FOR STEAM-ENGINES.

SPECIFICATION forming part of Letters Patent No. 227,059, dated April 27, 1880.

Application filed January 23, 1880.

*To all whom it may concern:*

Be it known that I, FRED. C. ROWLAND, of New Haven, in the county of New Haven and State of Connecticut, have invented a new Improvement in Pitman-Connections for Steam-Engines; and I do hereby declare the following, when taken in connection with the accompanying drawings and the letters of reference marked thereon, to be a full, clear, and exact description of the same, and which said drawings constitute part of this specification, and represent, in—

Figure 1:
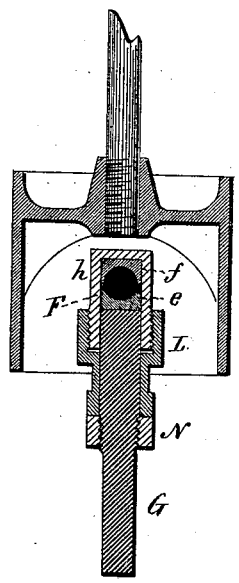
Figure 2:
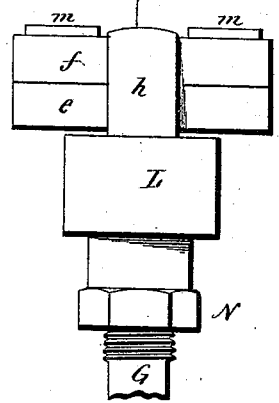
Figure 3:
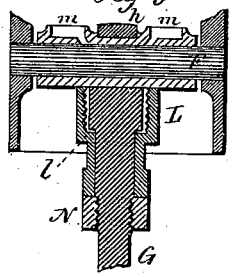

Figure 1, a transverse section; Fig. 2, a side view enlarged; Fig. 3, a section at right angles to Fig. 1.

This invention relates to an improvement in the construction of connecting-rod connections for steam-engines and other purposes; and the invention consists in the construction, as hereinafter described, and particularly recited in the claim.

As a means for attaching the connecting-rod I employ a divided box, *e f*, in length corresponding to the bearing-surface on the pin, and over this box I arrange the strap *h*, the two ends of which extend onto the connecting-rod G in similar manner to the usual construction, as shown in Fig. 1; but instead of the usual gib and key, I make the outer surface of the lower ends of the straps the segment of a circle and cut a screw-thread thereon, as seen in Fig. 1. The connecting-rod is constructed to bear against one part of the box, and with a shoulder, *l*, (see Fig. 3,) immediately below. Then onto the rod a sleeve-nut, L, is placed, shouldered corresponding to and so as to bear upon the shoulder *l* on the rod, and threaded above, corresponding to the thread on the strap, and so that by turning the said nut L in one direction it will draw the strap down upon the box, or, in the opposite direction, will loosen the strap upon the box. Thus the parts of the box may be adjusted by simply turning the nut L.

To prevent any accidental turning of the nut L a jam-nut, N, is applied to the connecting-rod.

As a means for lubricating the joint on the pin F the upper part of the box is constructed with recesses *m*, with apertures leading to the bearings, as seen in Fig. 3.

With this construction as a substitute for the gib and key, I am enabled to make the cross-head bearing entirely within the cross-head, which could not be done with the gib and key, because of the impossibility of introducing or adjusting the gib and key.

This connection, while designed especially for this particular arrangement of cross-heads, may be used to advantage in other kind or arrangement of cross-heads, and for other purposes where the usual divided box, strap, and gib and key are employed.

I claim—

The combination of the divided box *e f* and shouldered connecting-rod with screw-threaded strap and shouldered nut, substantially as and for the purpose specified.

FREDERICK C. ROWLAND.

Witnesses:
WM. L. FINCH,
E. LOCKWOOD.